United States Patent
Lewis et al.

(10) Patent No.: US 6,577,999 B1
(45) Date of Patent: Jun. 10, 2003

(54) METHOD AND APPARATUS FOR INTELLIGENTLY MANAGING MULTIPLE PRONUNCIATIONS FOR A SPEECH RECOGNITION VOCABULARY

(75) Inventors: James R. Lewis, Delray Beach, FL (US); Barbara Ballard, Kansas City, MO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/264,255

(22) Filed: Mar. 8, 1999

(51) Int. Cl.[7] ............................................... G10L 21/00
(52) U.S. Cl. ....................................... 704/270; 704/278
(58) Field of Search .................................. 704/270, 278

(56) References Cited

U.S. PATENT DOCUMENTS

| | | | | |
|---|---|---|---|---|
| 4,819,271 A | * | 4/1989 | Bahl et al. ................... | 704/231 |
| 4,903,305 A | * | 2/1990 | Gillick et al. ............... | 704/231 |
| 5,027,406 A | * | 6/1991 | Roberts et al. .............. | 704/231 |
| 5,271,088 A | * | 12/1993 | Bahler ......................... | 704/231 |
| 5,649,057 A | * | 7/1997 | Lee et al. .................... | 704/256 |
| 5,754,972 A | * | 5/1998 | Baker et al. ................. | 704/200 |
| 5,839,106 A | * | 11/1998 | Bellegarda ................... | 704/257 |
| 5,899,973 A | * | 5/1999 | Bandara et al. ............. | 704/256 |
| 5,907,825 A | * | 5/1999 | Tzirkel-Hancock ......... | 704/241 |
| 6,067,517 A | * | 5/2000 | Bahl et al. ................... | 704/256 |
| 6,073,098 A | * | 6/2000 | Buchsbaum et al. ........ | 704/255 |
| 6,154,722 A | * | 11/2000 | Bellegarda ................... | 704/257 |

* cited by examiner

Primary Examiner—Doris H. To
Assistant Examiner—Michael N. Opsasnick
(74) Attorney, Agent, or Firm—Akerman Senterfitt

(57) ABSTRACT

In a computer speech dictation system, a method for automatically managing a plurality of acoustic models. The method is intended to ensure that only high reliability acoustic models which accurately reflect word pronunciations for a given user are retained. The method is accomplished by assigning a base quality metric value for each of the acoustic models maintained by a speech recognition application. The quality metric is incremented or decremented upon the occurrence of certain events relevant to the reliablity of the acoustic model. Acoustic model are discarded when the quality metric value falls below a threshold value.

17 Claims, 5 Drawing Sheets

METHOD AND APPARATUS FOR INTELLIGENTLY MANAGING MULTIPLE PRONUNCIATIONS FOR A SPEECH RECOGNITION VOCABULARY

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of computer systems for speech recognition and more specifically to a system for managing multiple pronunciations for a speech recognition vocabulary.

2. Description of the Related Art

Speech recognition is the process by which an acoustic signal received by microphone is converted to a set of words by a computer. These recognized words may then be used in a variety of computer software applications for purposes such as document preparation, data entry and command and control. Speech recognition is generally a difficult problem due to the wide variety pronunciations, individual accents and speech characteristics of individual speakers. Acoustic models are stored representations of word pronunciations a speech recognition application uses to help identify words spoken by a user. As part of the speech recognition process, these acoustic models are compared to the pronunciations of words as they are spoken by a user in order to identify a corresponding text word.

There are several ways that acoustic models can be inserted into the vocabulary of a speech recognition application. For example, developers of speech recognition systems commonly provide an initial set of acoustic models or base forms for a basic vocabulary set and possibly for auxiliary vocabularies. In some cases, multiple acoustic models are provided for words with more than one pronunciation.

Since each particular user will tend to have their own style of speaking, it is important that the speech recognition system have the capability to recognize a particular user's pronunciation of certain spoken words. By permitting the user to update the acoustic models used for word recognition, it is possible to improve the overall accuracy of the speech recognition process for that user and thereby permit greater efficiencies.

Conventional speech recognition products that allow additional acoustic models for alternative pronunciations of words typically require the user to decide when such acoustic models are to be added to those already existing. Significantly, however, this tends to be an extremely difficult decision for users to make since users often do not understand the basis upon which such a decision is to be made. Moreover, the task of managing multiple sets of acoustic models to account for variations in pronunciation can be a problem in a speech recognition application. For example, it is not desirable to maintain and store in memory large numbers of alternative acoustic models which do not truly reflect a user's word pronunciations. Also, acoustic models which are inappropriate for a particular user's pronunciations can cause repeated undesirable errors in otherwise unrelated words in the speech recognition process.

SUMMARY OF THE INVENTION

The invention concerns a method and system for automatically managing acoustic models in a computer speech dictation system. The method is intended to ensure that only high reliability acoustic models which accurately reflect word pronunciations for a given user are retained. The method is accomplished by assigning a base quality metric value for each of the acoustic models maintained by a speech recognition application. The quality metric is incremented or decremented upon the occurrence of certain events relevant to the reliability of the acoustic model. Acoustic models are discarded when the quality metric value falls below a threshold value.

According to one aspect, the method includes the step of decrementing the value of the quality metric when a text word associated with a particular acoustic model is amended. Such amendments can be in the form of corrections or deletions of existing text which has been dictated by a user. The quality metric is decremented in such instances to indicate a lower degree of reliability associated with the particular acoustic model. According to another aspect of the invention, the method can include the step of decrementing the quality metric when an additional acoustic model is added to those already existing for a text word. Conversely when an acoustic model is used to correctly identify a dictated word, the quality metric of the particular acoustic model is advantageously incremented so as to indicate a greater degree of reliability.

The method can also include the step of determining whether an alternate acoustic model exists for a particular text word before discarding the acoustic model. This step ensures that an acoustic model is not discarded unless there exists some better alternative model. In this regard, an acoustic model is preferably not discarded unless its quality metric is less than the quality metric of any alternate acoustic model which is available.

According to another aspect, the invention can further include the step of discarding an existing acoustic model when a new acoustic model has been provided and the existing acoustic model has been flagged as originating from an unreliable source. Unreliable sources include any function capable of generating an acoustic model which is derived from text-to-speech analysis, copied acoustic models, and typed pronunciations.

According to another aspect of the invention, the method as described herein can be implemented in a computer speech recognition system. According to yet another aspect, the invention can be implemented as a machine readable storage for implementing the foregoing method on a computer system.

BRIEF DESCRIPTION OF THE DRAWINGS

There are presently shown in the drawings embodiments which are presently preferred, it being understood, however, that the invention is not so limited to the precise arrangements and instrumentalities shown, wherein.

DETAILED DESCRIPTION OF THE INVENTION

Figure 1:
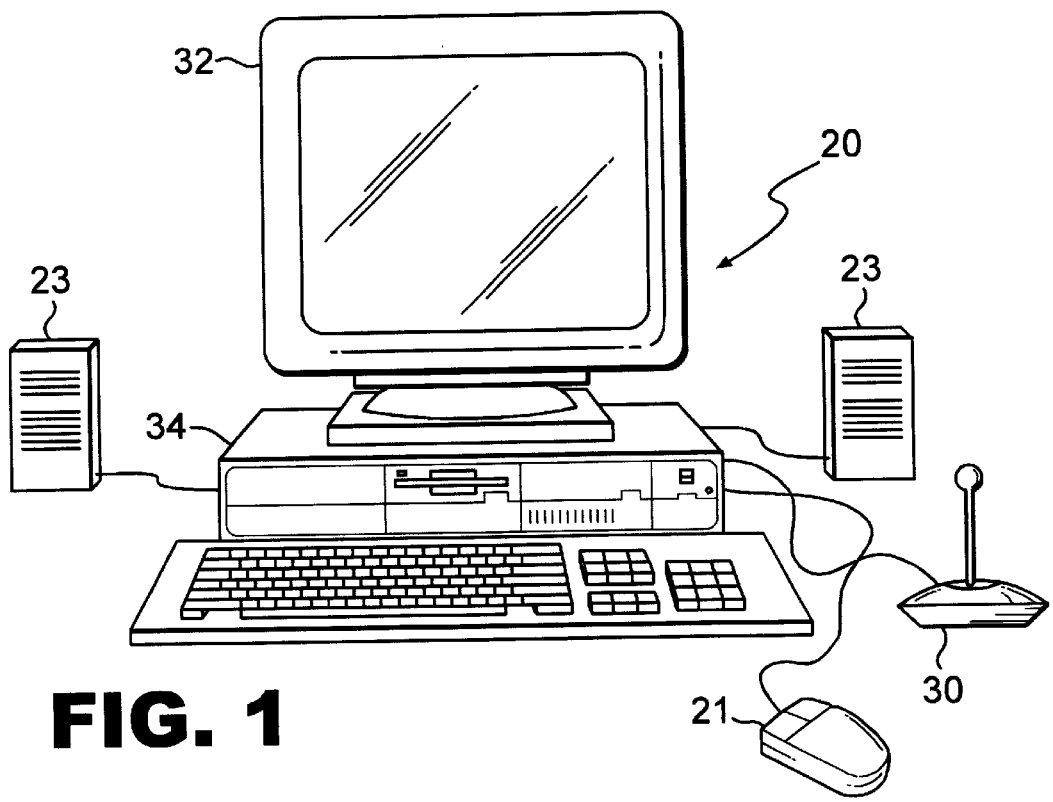
FIG. 1 shows a computer system for speech recognition on which the system of the invention can be used.

FIG. 1 shows a typical computer system 20 for use in conjunction with the present invention. The system is preferably comprised of a computer 34 including a central processing unit (CPU), one or more memory devices and associated circuitry. The system also includes a microphone 30 operatively connected to the computer system through suitable interface circuitry or "sound board" (not shown), and at least one user interface display unit 32 such as a video data terminal (VDT) operatively connected thereto. The CPU can be comprised of any suitable microprocessor or other electronic processing unit, as is well known to those skilled in the art. An example of such a CPU would include the Pentium or Pentium II brand microprocessor available from Intel Corporation or any similar microprocessor. Speakers 23, as well as an interface device, such as mouse 21, can also be provided with the system, but are not necessary for operation of the invention as described herein.

The various hardware requirements for the computer system as described herein can generally be satisfied by any one of many commercially available high speed multimedia personal computers offered by manufacturers such as International Business Machines Corporation (IBM), Compaq, Hewlett Packard, or Apple Computers.

Figure 2:
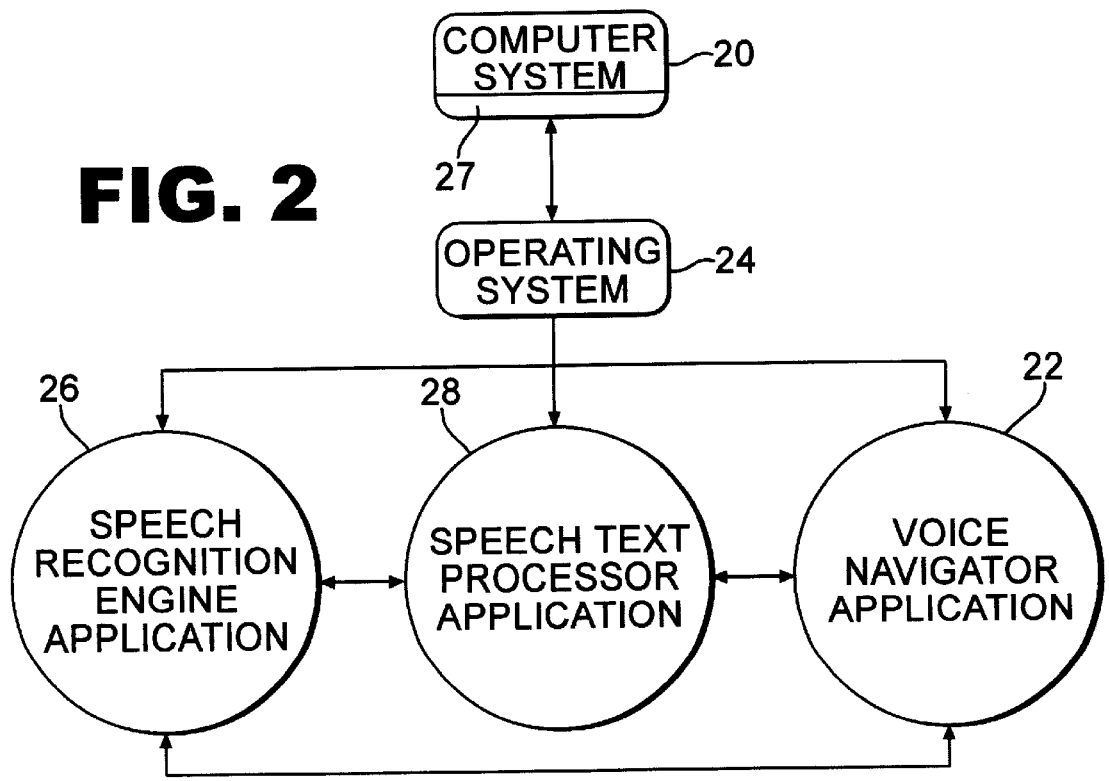
FIG. 2 is a block diagram showing a typical high level architecture for the computer system in FIG. 1.

FIG. 2 illustrates a typical architecture for a speech recognition system in computer 20. As shown in FIG. 2, the system typically includes an operating system 24 and a speech recognition engine application 26. A speech text processor application 28 and a voice navigator application 22 can also be provided.

In FIG. 2, the speech recognition engine 26, speech text processor 28 and the voice navigator 22 are shown as separate application programs. It should be noted however that the invention is not limited in this regard, and these various applications could, of course be implemented as a single, more complex application program. Also, if no other speech controlled application programs are to be operated in conjunction with the speech text processor application and speech recognition engine, then the system can be modified to operate without the voice navigator application. The voice navigator primarily helps coordinate the operation of the speech recognition engine application.

As previously noted, the speech recognition engine application 26 and the speech text processor application 28 can be implemented in the form of distinct application programs or can be integrated to form a single, integrated, application. If the two applications are fully integrated, then operating system inputs from keyboard or mouse movements will be immediately accessible to the speech recognition application. It will be readily appreciated by those skilled in the art that in those instances where the speech recognition engine application 20 is designed independently of the speech text processor application, then suitable application hooks or interfaces must provided to permit the speech recognition engine application 26 to identify user keyboard inputs and mouse commands which are used to amend the dictated text in the speech text processor application 28. Similarly, the speech recognition application 26 preferably is provided with suitable means to identify specific words which are being edited by the user. This can be accomplished using various methods which are known to programmers skilled in the art. For example, the speech recognition engine application can use certain existing operating system hooks to insert itself into the speech text processor application. Further, the words in the dictated word processing document can be assigned identifying tags by the speech recognition application as they are inserted in the speech text processor application document. Thus, each word can be readily identified by the speech recognition engine application 26 if the user performs any amendment or editing function with respect thereto.

In a preferred embodiment which shall be discussed herein, operating system 24 is one of the Windows family of operating systems, such as Windows NT, Windows 95 or Windows 98 which are available from Microsoft Corporation of Redmond, Wash. However, the system is not limited in this regard, and the invention can also be used with any other type of computer operating system. The system as disclosed herein can be implemented by a programmer, using commercially available development tools for the operating systems described above. As shown in FIG. 2, computer system 20 includes a computer memory device 27, which is preferably comprised of an electronic random access memory and a bulk data storage medium, such as a magnetic disk drive.

Audio signals representative of sound received in microphone 30 are processed within computer 20 using conventional computer audio circuitry so as to be made available to the operating system 24 in digitized form. The audio signals received by the computer are conventionally provided to the speech recognition engine application 26 via the computer operating system 24 in order to perform speech recognition functions. As in conventional speech recognition systems, the audio signals are processed by the speech recognition engine 26 to identify words spoken by a user into microphone 30.

Figure 3:
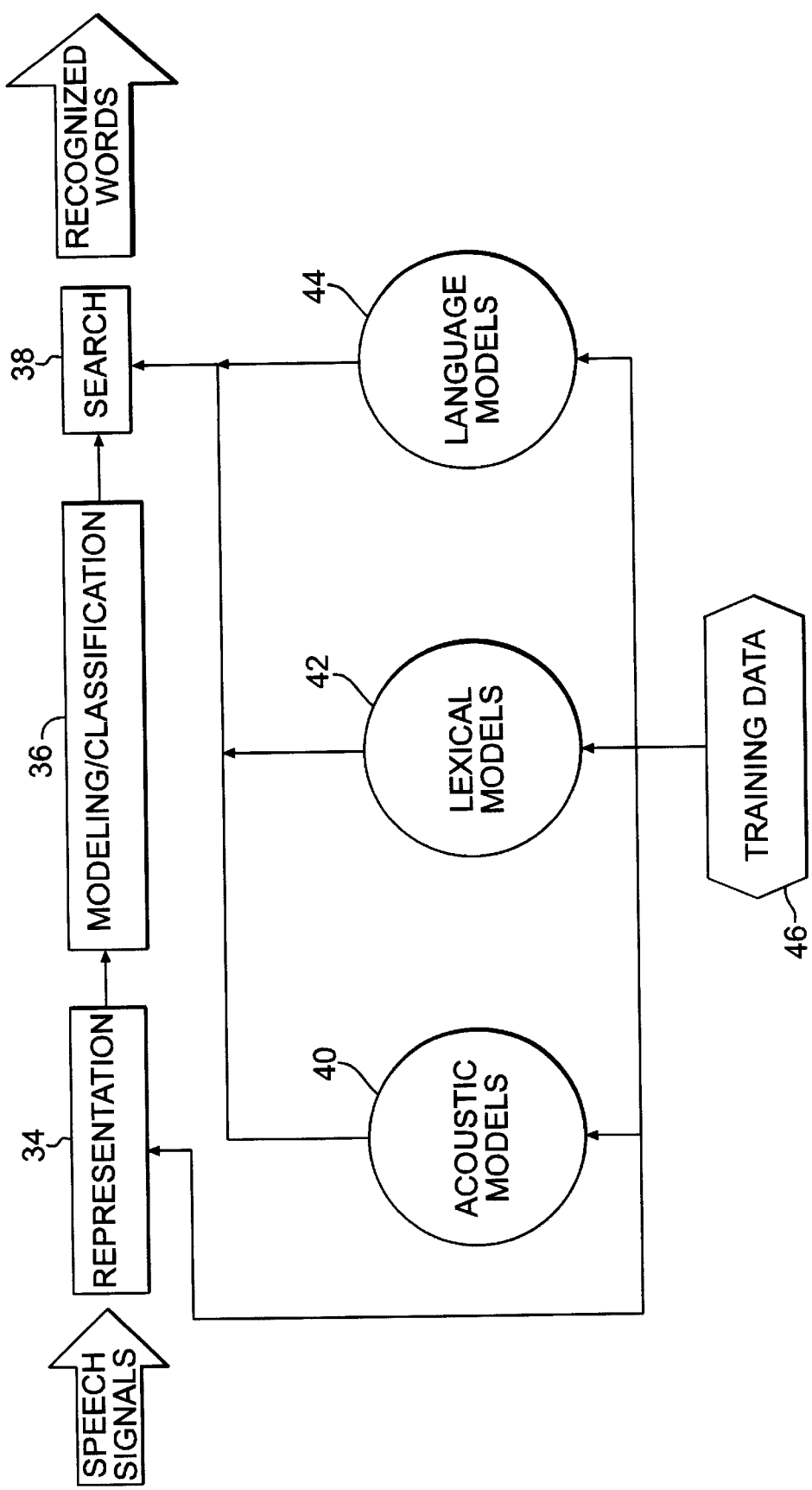
FIG. 3 is a block diagram showing a typical architecture for a speech recognition engine.

FIG. 3 is a block diagram showing typical components which comprise speech recognition application 26. As shown in FIG. 3 the speech recognition engine 26 receives a digitized speech signal from the operating system. The signal is subsequently transformed in representation block 34 into a useful set of data by sampling the signal at some fixed rate, typically every 10–20 msec. The representation block produces a new representation of the audio signal which can then be used in subsequent stages of the voice recognition process to determine the probability that the portion of waveform just analyzed corresponds to a particular phonetic event. This process is intended to emphasize perceptually important speaker independent features of the speech signals received from the operating system. In modeling/classification block 36, algorithms process the speech signals further to adapt speaker-independent acoustic models to those of the current speaker. Finally, in search block 38, search algorithms are used to guide the search engine to the most likely words corresponding to the speech signal. The search process in search block 38 occurs with the help of acoustic models 40, lexical models 42 and language models 44.

Acoustic models 40 are stored representations of word pronunciations. The speech recognition application uses these acoustic models to help identify words spoken by a user. As part of the speech recognition process, these acoustic models are compared to the speech signals created by a user utterance in order to identify a corresponding text word.

Figure 4:
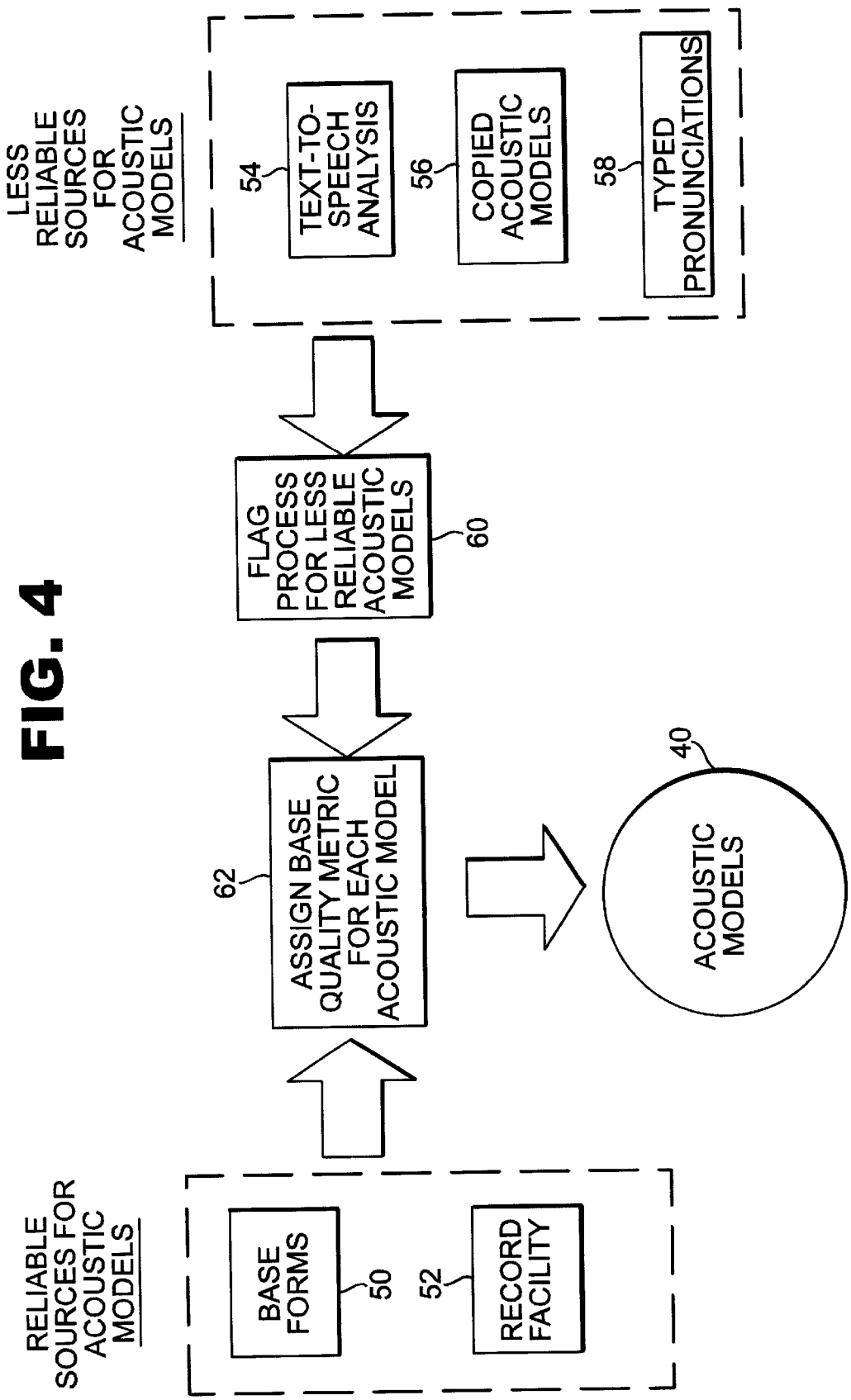
FIG. 4 is a block diagram illustrating sources of acoustic models and a process for establishing a base quality metric.

As shown in FIG. 4, base forms acoustic models 50 are commonly provided to the speech recognition application by the application developer. In addition, there are several other ways for new acoustic models to be provided to a speech recognition application. A second way is for the user to provide a new pronunciation using a record facility 52 which is conventionally provided with the speech recognition system vocabulary manager or correction procedure. This common feature permits a user to record his own pronunciation of a particular word. The recording is used by the speech recognition system to create an acoustic model which uniquely models the individual user's pronunciation and can subsequently be made available to the speech recognition system.

A third way for new acoustic models to be provided to the speech recognition system is through the use of text-to-speech (TTS) analysis 54. Text to speech analysis refers to a process by which existing text is analyzed by a speech recognition application system. The speech recognition system uses the text to discover words which are not included in its present vocabulary. The speech recognition system automatically creates its own acoustic model for each of these out-of-vocabulary words. These acoustic models correspond to pronunciations that may or may not be correct for a particular word.

A fourth way for installing new acoustic models is for the user to provide copied acoustic models 56 generated by a different user. Finally, a fifth way for the speech recognition system to be provided with new acoustic models is for the user to make use of a typed a pronunciation procedure 58, using either a "sounds-like" process or a phonetic alphabet.

As shown in FIG. 4, the originally installed base forms 50 provided by the application developers and the record facility 52 are generally deemed reliable acoustic models for a given user. By comparison, the other methods 54, 56 and 58 provide less reliable pronunciations. According to a preferred embodiment of the present invention, these varying degrees of reliability are initially addressed by a flagging procedure 60 as shown in FIG. 4. This flagging procedure sets a flag for acoustic models generated by these less reliable sources. The flag may be any suitable code or header information associated with the acoustic model which is capable of distinguishing these less reliable sources of acoustic models from more reliable sources. Thus, the speech recognition engine application will have a means for subsequently identifying for special handling those acoustic models which were obtained from a less than reliable source. The purpose of the flag will be described in greater detail relative to FIG. 5.

Regardless of the source of the acoustic models, each is assigned a base quality metric in block 62 before it is made available to the speech recognition engine application. This quality metric is some index value intended as a measure of the overall reliability of an acoustic model. All acoustic models can initially be assigned the same base quality metric. Alternatively, the base quality metric can be assigned in a more sophisticated manner, giving higher quality values to acoustic models from more reliable sources. In any case, once the base quality metric has been assigned, the acoustic models 40 are stored in memory for use by the speech recognition engine application 26.

Figure 5A:
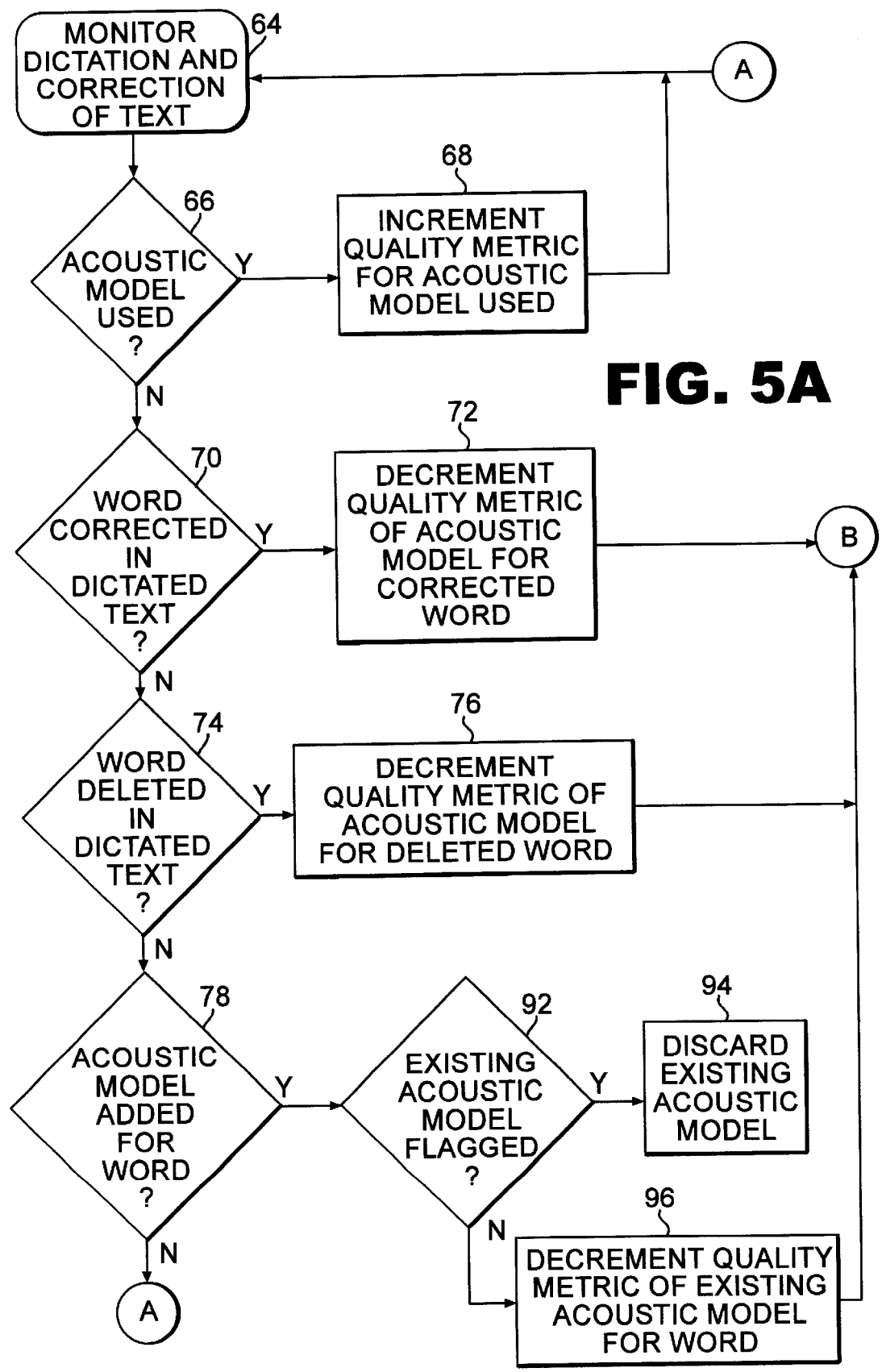
FIGS. 5A and 5B are flow charts showing a process for managing multiple acoustic models to maintain only those which are most reliable.
Figure 5B:
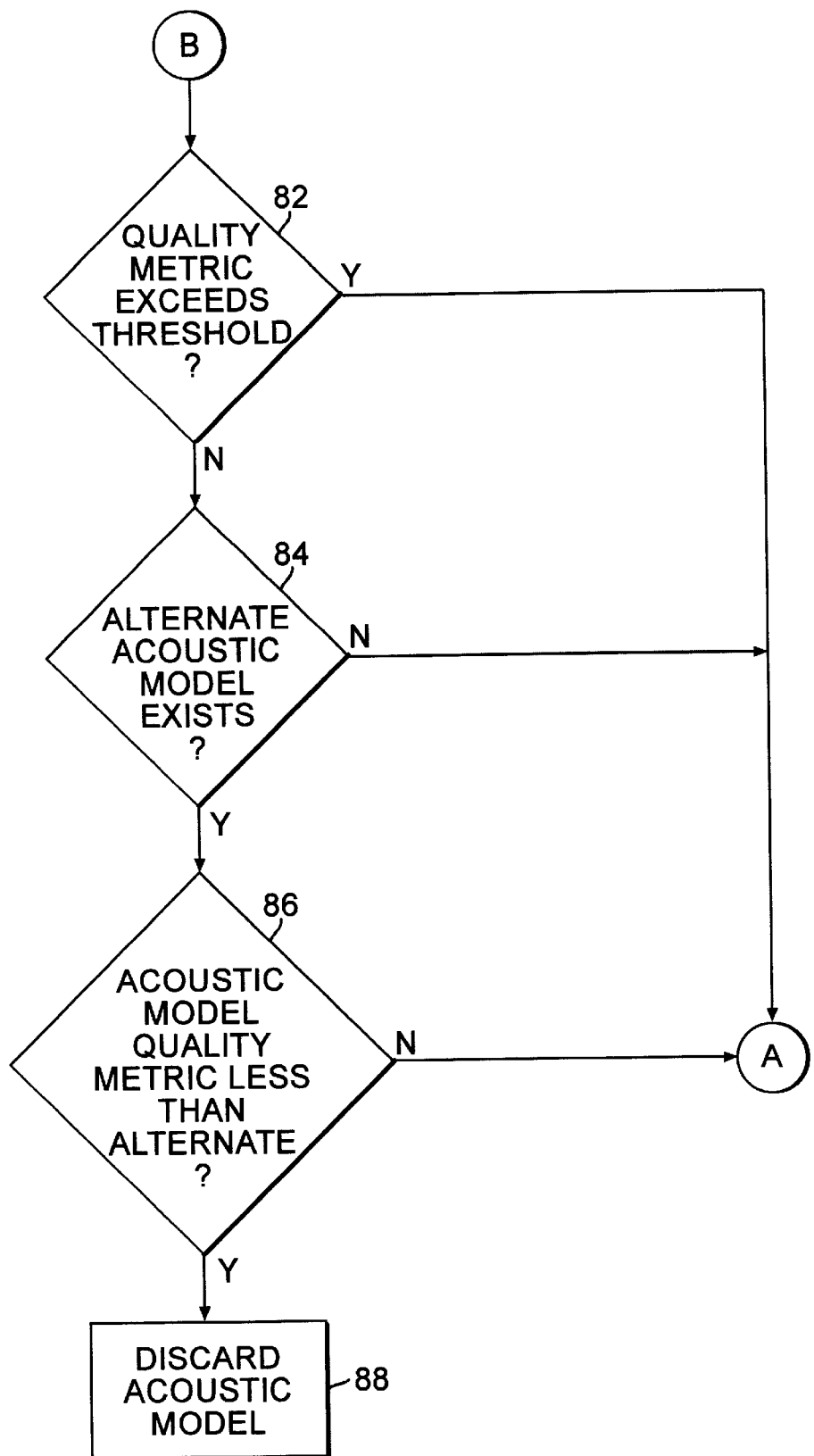

FIGS. 5a and 5b are a flow chart illustrating a process according to a preferred embodiment of the invention for speech recognition applications as described herein. As will hereinafter be explained in greater detail, the system is designed to more efficiently manage acoustic models 40 to ensure that they are routinely updated to more closely match the unique pronunciation of words by an individual user. The invention provides a method of automatically determining whether newer acoustic models should be merely added to existing acoustic models or should be used to replace such models.

In step 64 of FIG. 5A, the speech recognition engine application continuously monitors the dictation and subsequent correction of text by a user. As the dictation or text correction proceeds, the system proceeds through a process which is intended to identify acoustic models which should be discarded. Thus, in step 66, a determination is made as to whether a particular acoustic model has been used by the speech recognition application to successfully identify a dictated word. In each such instance where an acoustic model is successfully used to identify a dictated word, the quality metric for the acoustic model is incremented to indicate a greater degree of reliability to be associated with that particular acoustic model. The specific increment value can be selected by the programmer and preferably will depend upon the overall scaling of the quality metric index selected by the programmer and other design considerations relating to the rate at which acoustic models are to be discarded.

In step 70, the system determines whether a word appearing in dictated text has been corrected by a user. Identification of words which have been corrected can be accomplished by various conventional means as will be readily appreciated by those skilled in the art. For example, such correction may be identified as such when the speech text processor is placed in an error correction mode and a user identifies an amendment as a word correction. Alternatively any other suitable process may be used to identify words which have been corrected in dictated text. If a word correction is identified in step 70, then the quality metric for the acoustic model is decremented in step 72. The decrement, like the increment value, is preferably selected by the application programmer in accordance with the overall scaling of the quality metric index and other design considerations relating to the rate at which acoustic models are to be discarded.

Similarly, in step 74 the system determines whether a dictated text word has been deleted. In the case where such a deletion has occurred, the quality metric is decremented as previously described in step 70 by a predetermined amount.

Finally, in step 78 a determination is made as to whether an acoustic model has been added in the case where an acoustic model already exists for that word. The addition of a new acoustic model for a word is taken as an indication that a user is dissatisfied with the speech recognition results achieved using the current acoustic model. In such instances, the system determines whether the existing acoustic model is one which was flagged. As shown in FIG. 4, acoustic models from less reliable sources 54, 56, and 58 are preferably flagged in block 60 prior to being made available to the speech recognition engine application 26. In the case where the existing acoustic model is determined to have a flag, then it is automatically discarded in step 94 after a new acoustic model is provided. Alternatively, if the existing acoustic model has not been flagged, then the quality metric for the existing acoustic model is decremented in step 96 in the manner which has previously been described relative to steps 72 and 76.

In each instance where the quality metric has been decremented, a further determination is made in step 82 as to whether the new value for the quality metric exceeds a minimum threshold. If it does not exceed a minimum threshold, the acoustic model is deemed unreliable and is preferably discarded if a more reliable acoustic model is available. Thus, where the minimum threshold is not met, the system checks in step 84 to determine whether an alternate acoustic model exists. Where an alternate acoustic model does exist for a particular word, a final determination is made in step 86 to evaluate whether the quality metric is better or worse than the quality metric of the alternate acoustic model. The acoustic model is discarded in step 88 if the alternate word acoustic model has a higher quality metric.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. In a computer speech dictation system, a method for automatically managing a plurality of acoustic models, comprising the steps of:
   assigning a base quality metric value for each of said plurality of acoustic models, wherein each of said plurality of acoustic models is associated with a same word, said quality metric value determining when to discard particular ones of said plurality of acoustic models;
   decrementing said quality metric value assigned to one of said acoustic models when a text word associated with said acoustic model is amended; and
   discarding said acoustic model when said quality metric value falls below a threshold value.

2. The method according to claim 1 wherein said decrementing step is performed when said text word associated with said acoustic model is at least one of corrected and deleted.

3. The method according to claim 1 further comprising the step of decrementing said quality metric of said acoustic model when at least one additional acoustic model is added for said text word.

4. The method according to claim 1 further comprising the step of incrementing said quality metric when said acoustic model is used to correctly identify a dictated word.

5. The method according to claim 1 further comprising the step of determining whether an alternate acoustic model exists for said text word before discarding said acoustic model.

6. The method according to claim 5 further comprising the step of determining prior to said discarding step whether said quality metric for said acoustic model is less than the quality metric of said alternate acoustic model.

7. The method according to claim 1 further comprising the step of discarding an existing acoustic model when a new acoustic model has been provided and the existing acoustic model has been flagged as originating from an unreliable source.

8. The method according to claim 7 wherein said unreliable source is selected from at least one of the group consisting of text-to-speech analysis, copied acoustic models, and typed pronunciations.

9. A computer speech dictation system, for automatically managing a plurality of acoustic models, comprising the steps of:
   assigning means for assigning a base quality metric value for each of said plurality of acoustic models, wherein each of said plurality of acoustic models is associated with a same word, said quality metric value determining when to discard particular ones of said plurality of acoustic models;
   decrementing means for decrementing said quality metric value assigned to one of said acoustic models when a text word associated with said acoustic model is amended; and
   discarding means for discarding said acoustic model when said quality metric value falls below a threshold value.

10. The computer speech dictation system according to claim 9 wherein said decrementing means decrement said quality metric value when said text word associated with said acoustic model is at least one of corrected and deleted.

11. The computer speech dictation system according to claim 9 wherein said decrementing means decrements said quality metric of said acoustic model when at least one additional acoustic model is added for said text word.

12. The computer speech dictation system according to claim 9 wherein said incrementing means increments said quality metric when said acoustic model is used to correctly identify a dictated word.

13. The computer speech dictation system according to claim 9 further comprising means for determining whether an alternate acoustic model exists for said text word before discarding said acoustic model.

14. The computer speech dictation system according to claim 13 further comprising means for determining prior to discarding said acoustic model whether said quality metric for said acoustic model is less than the quality metric of said alternate acoustic model.

15. The computer speech dictation system according to claim 9 further comprising means for discarding an existing acoustic model when a new acoustic model has been provided and the existing acoustic model has been flagged as originating from an unreliable source.

16. The computer speech dictation system according to claim 15 wherein said unreliable source is selected from at least one of the group consisting of text-to-speech analysis, copied acoustic models, and typed pronunciations.

17. A machine readable storage, having stored thereon a computer program having a plurality of code sections executable by a machine for causing the machine to perform the steps of:
   assigning a base quality metric value for each of a plurality of acoustic models in a speech recognition system, wherein each of said plurality of acoustic models is associated with a same word, said quality metric value determining when to discard particular ones of said plurality of acoustic models;
   decrementing said quality metric value assigned to one of said acoustic models when a text word associated with said acoustic model is amended; and
   discarding said acoustic model when said quality metric value falls below a threshold value.

* * * * *